United States Patent
Simmonds et al.

(10) Patent No.: US 9,400,387 B2
(45) Date of Patent: Jul. 26, 2016

(54) PROJECTION DISPLAY

(75) Inventors: Michael David Simmonds, Rochester Kent (GB); Mohmed Salim Valera, Rochester Kent (GB)

(73) Assignee: BAE SYSTEMS, plc, London (GB)

(*) Notice: Subject to any disclaimer, the term of this patent is extended or adjusted under 35 U.S.C. 154(b) by 77 days.

(21) Appl. No.: 14/238,992

(22) PCT Filed: Aug. 13, 2012

(86) PCT No.: PCT/GB2012/051972
§ 371 (c)(1),
(2), (4) Date: Mar. 24, 2014

(87) PCT Pub. No.: WO2013/024277
PCT Pub. Date: Feb. 21, 2013

(65) Prior Publication Data
US 2014/0218801 A1  Aug. 7, 2014

(30) Foreign Application Priority Data

Aug. 17, 2011  (GB) .................................. 1114149.6

(51) Int. Cl.
G02B 27/01 (2006.01)
G02B 27/10 (2006.01)
(Continued)

(52) U.S. Cl.
CPC ........ *G02B 27/0101* (2013.01); *G02B 27/1086* (2013.01); *G02B 5/18* (2013.01); *G02B 6/0076* (2013.01); *G02B 2027/0112* (2013.01); *G02B 2027/0123* (2013.01)

(58) Field of Classification Search
CPC ...... G02B 5/18; G02B 27/01; G02B 27/0103; G02B 2027/0112; G02B 2027/0116; G02B 2027/0123; G02B 2027/0125; G02B 2027/1086
USPC .................................................. 359/566–569
See application file for complete search history.

(56) References Cited

U.S. PATENT DOCUMENTS

| 2006/0132914 | A1 | 6/2006 | Weiss et al. |
| 2006/0228073 | A1 | 10/2006 | Mukawa et al. |
| 2010/0177388 | A1* | 7/2010 | Cohen .................. G02B 6/0038 359/566 |

FOREIGN PATENT DOCUMENTS

| EP | 2381290 A1 | 10/2011 |
| JP | 2007011057 A | 1/2007 |

(Continued)

OTHER PUBLICATIONS

International Preliminary Report on Patentability and Written Opinion received for Patent Application No. PCT/GB2012/051972. Issuance of Report—Feb. 18, 2014, 7 pages.
(Continued)

*Primary Examiner* — Thomas K Pham
*Assistant Examiner* — Marin Pichler
(74) *Attorney, Agent, or Firm* — Finch & Maloney PLLC

(57) ABSTRACT

The present invention provides a projection display (10) for projecting a color image to a viewer (12) overlaid on a real world scene viewed through the display. The display comprises an image generator (16) for generating image bearing chromatic light for injection into a waveguide assembly (28) at a first range of field angles (44) and a second range of field angles (46). The waveguide assembly comprises a first waveguide (30) having a first input diffraction region (32) arranged to couple image bearing chromatic light in the first range of field angles into the first waveguide to propagate by total internal reflection; and a second waveguide (40) having a second input diffraction region (42) arranged to couple image bearing chromatic light in the second range of field angles into the second waveguide to propagate by total internal reflection. The first and second waveguides have first and second output diffraction regions (48, 50) arranged to output image bearing chromatic light from the respective waveguides for projecting a color image in the first and second range of field angles to a viewer overlaid on a real world scene viewed through the waveguide assembly.

13 Claims, 11 Drawing Sheets

(51) Int. Cl.
*G02B 5/18* (2006.01)
*F21V 8/00* (2006.01)

(56) References Cited

FOREIGN PATENT DOCUMENTS

| WO | 2004109349 | A2 | 12/2004 |
|----|------------|----|---------|
| WO | 2006106501 | A1 | 10/2006 |
| WO | 2007052265 | A2 | 5/2007 |
| WO | 2007141587 | A1 | 12/2007 |
| WO | 2009077802 | A1 | 6/2009 |
| WO | 2010067114 | A1 | 6/2010 |
| WO | 2011131978 | A1 | 10/2011 |
| WO | 2013024277 | A1 | 2/2013 |

OTHER PUBLICATIONS

International Search Report received for Patent Application No. PCT/GB2012/051972, mailed on Jun. 11, 2012, 4 pages.
GB Intellectual Property Office Search Report under Section 17(5) received for GB Patent Application No. 1114149.6 mailed Dec. 19, 2011, 4 pages.
GB Intellectual Property Office Search Report under Section 17(5) received for GB Patent Application No. 1214666.8 mailed Dec. 13, 2012, 4 pages.

* cited by examiner

Fig. 4
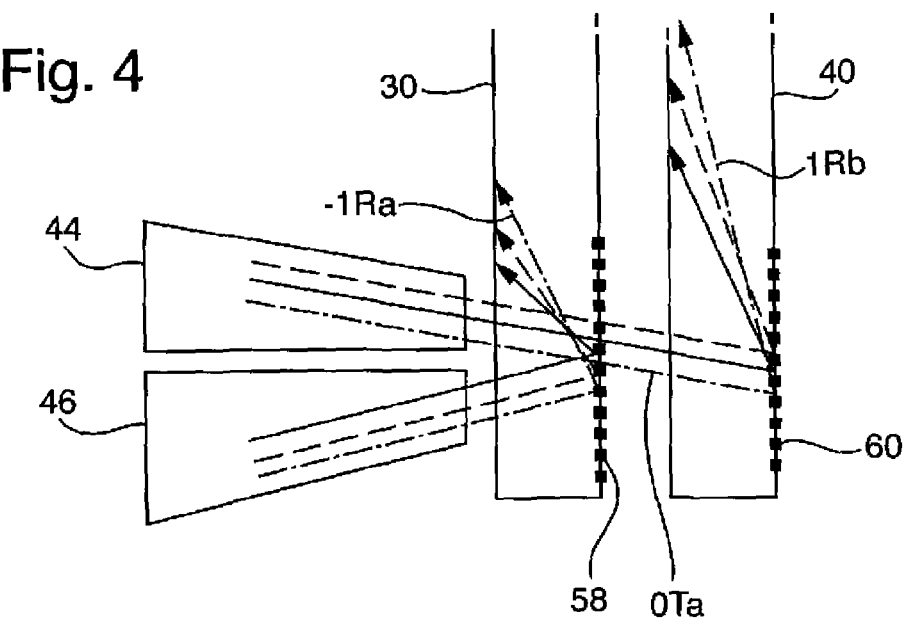
Fig. 5
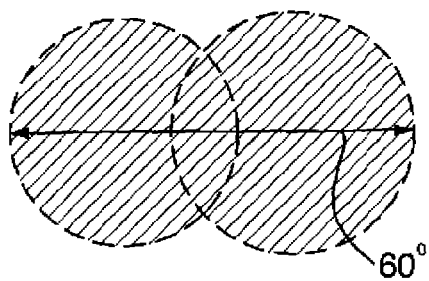
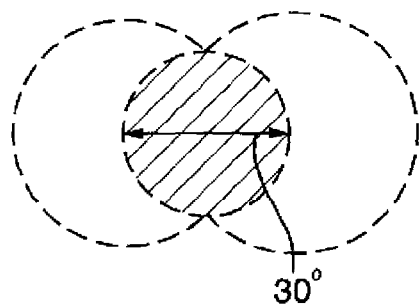
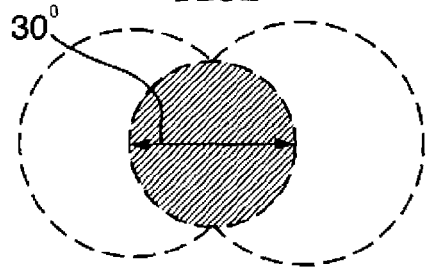

PROJECTION DISPLAY

The present invention relates to a projection display for projecting a colour image to a viewer overlaid on a real world scene, for example, in a head mounted display.

Head up and head mounted displays are known and are typically constrained to project monochromatic images to a viewer. Such images may include symbology which is a term of art in this field and refers to data, graphics or other information. For example, in a head mounted display for use by a pilot of an aircraft, the symbology may be altitude, bearing or information relating to objects moving relative to the aircraft.

A known projection display is shown in the present applicant's earlier patent publication WO2010/119240 and in FIG. 13 of the drawings included herewith, the contents of which are hereby incorporated by reference. Referring to FIG. 13, image-bearing light having a relatively small input pupil 61 is generated by an image generator (not shown) for injection into a waveguide assembly. The waveguide assembly expands the input pupil in first and second generally orthogonal directions so that image-bearing light with an expanded exit pupil 18 is output from the waveguide assembly for viewing by a viewer, overlaying a real world scene being viewed through the waveguides. Therefore, the waveguide assembly forms an optical combiner.

In more detail, a waveguide 20 has an input diffraction region 22 for coupling image-bearing light with a small input pupil 61 into the waveguide 20 for propagation by total internal reflection. Upon entry into the waveguide 20, the input image-bearing light propagates firstly towards a reflective surface 24 from where it is directed by reflection towards a second diffractive region 26 which, in turn, redirects the light towards a third diffractive region 34. The second and third diffraction regions 26, 34 are arranged to expand the input pupil of the image-bearing light in first and second dimensions 25, 31 respectively. The third diffraction region 34 is arranged as an output grating for coupling the image-bearing light out of the waveguide 20 with an expanded exit pupil 18 such that it may be seen overlaying the real world scene by a viewer.

The diffractive regions 22, 26 and 34 in the prior art arrangement of FIG. 13 are arranged to diffract light in a given order and their configuration is dependent upon the wavelength of the image bearing light. Generally speaking the use of a narrow band of wavelengths yields better results in such a display device than a broadband range of wavelengths. If a laser light source is used the light has a relatively precise wavelength. For example, a green laser light source may produce light of 532 nm. An LED light source produces light over a small range of wavelengths for example between 450 and 550 nm. A colour light source has red, green and blue light covering a relatively large range of wavelengths, between about 350 and 750 nm.

The diffraction gratings 22, 26 and 34 shown in FIG. 13 cannot be optimised for all wavelengths of image bearing chromatic, or colour, light. Experimentation and optical modelling has shown that a colour image can be produced but the exit pupil has, for most purposes, an unacceptably small field of view. If the exit pupil of an image is centred over the output region 34, the viewer would be able to see a colour image but would have difficulty seeing the image from viewing angles significantly different to 0° (the direction of dimension Z in FIG. 13).

The present invention provides a projection display device for projecting a colour image that may be viewed overlain on a real world scene being viewed through the display device, the display device comprising: an image generator for generating image bearing chromatic light for injection into a waveguide assembly at a first range of field angles and a second range of field angles; the waveguide assembly comprising: a first waveguide having a first input diffraction region arranged to couple image bearing chromatic light in the first range of field angles into the first waveguide to propagate by total internal reflection; a second waveguide having a second input diffraction region arranged to couple image bearing chromatic light in the second range of field angles into the second waveguide to propagate by total internal reflection; the first and second waveguides having first and second output diffraction regions arranged to output image bearing chromatic light from the respective waveguides for projecting a colour image in the first and second range of field angles to a viewer overlaid on a real world scene viewed through the waveguide assembly.

The first input diffraction region may serve to split the field of view so that one sub-field propagates through one waveguide and another sub-field propagates through another waveguide. In this way, splitting of the field of view is not required in advance of the waveguide assembly with additional and possibly expensive optics. If field of view is to be split into more than two sub-fields and more than two waveguides are required, the first input diffraction region and a second input diffraction region splits the field of view.

In this regard, the first input diffraction region may be arranged to be generally transmissive to image bearing chromatic light in the second range of field angles allowing the light in the second range of field angles to pass through the first waveguide to the second waveguide.

In one embodiment, the first input diffraction region may be arranged to couple into the first waveguide at least one wavelength of the image bearing chromatic light across the full extent of the first range of field angles and the first output diffraction region may be arranged to output light of said at least one wavelength from the first waveguide across the full extent of the first range of field angles.

The second input diffraction region may be arranged to couple into the second waveguide at least one wavelength of the image bearing chromatic light across the full extent of the second range of field angles and the second output diffraction region may be arranged to output light of said at least one wavelength from the first waveguide across the full extent of the second range of field angles.

Image bearing chromatic light of a wavelength different from said at least one wavelength may be coupled into and output from the first and the second waveguides across less than the full extent of the first range of field angles and the second range of field angles such that the image output from the waveguide assembly can be viewed over a larger range of field angles for light of said at least one first wavelength and a smaller range of field angles for light of said different wavelengths.

The difference between the larger range of field angles and the smaller range of field angles may correspond generally to the peripheral vision of a human viewer and the smaller range of field angles may correspond generally to the full colour or foveal perception of a human viewer.

Said at least one wavelength may correspond generally to green light and said different wavelengths may correspond generally to red and blue light.

The first range of field angles may be from about 0° perpendicular to the plane of the waveguide assembly to between +10° and +30° to the perpendicular and the second range of field angles may be from about 0° perpendicular to the plane of the waveguide assembly to between −10° and −30° to the perpendicular.

The image generator may be arranged to generate an input pupil of image bearing chromatic light for expansion in first and second generally orthogonal dimensions by the waveguide assembly and for outputting an expanded exit pupil from the assembly, and the first and second waveguides comprise respectively first expansion diffraction regions for expanding the input pupil in the first dimension and second expansion diffraction regions for expanding the input pupil in the second dimension, said first and second output diffraction regions forming one of said first expansion diffraction regions or said second expansion diffraction regions.

The first range of field angles and the second range of field angles may be ranges in at least one of the first dimension or the second dimension.

The first dimension may correspond generally with a horizontal dimension with respect to the viewer and the second dimension may correspond generally with a vertical dimension with respect to the viewer, and the first and the second ranges of field angles are angles in the horizontal dimension such that the total range of field angles output from the waveguide assembly is larger in the horizontal dimension than in the vertical dimension.

The image generator may comprise a light processor for generating image bearing light and a lens for directing said image bearing light towards the waveguide assembly over the first and the second range of field angles.

In order that the present invention may be well understood, preferred embodiments thereof, which are given by way of example only, will now be described with reference to the accompanying drawings, in which:

FIG. 4 shows schematically part of another projection display in use;

FIG. 5 shows in simplified form reproduction of colour and field of view in the projection display of FIG. 3;

Figure 1:
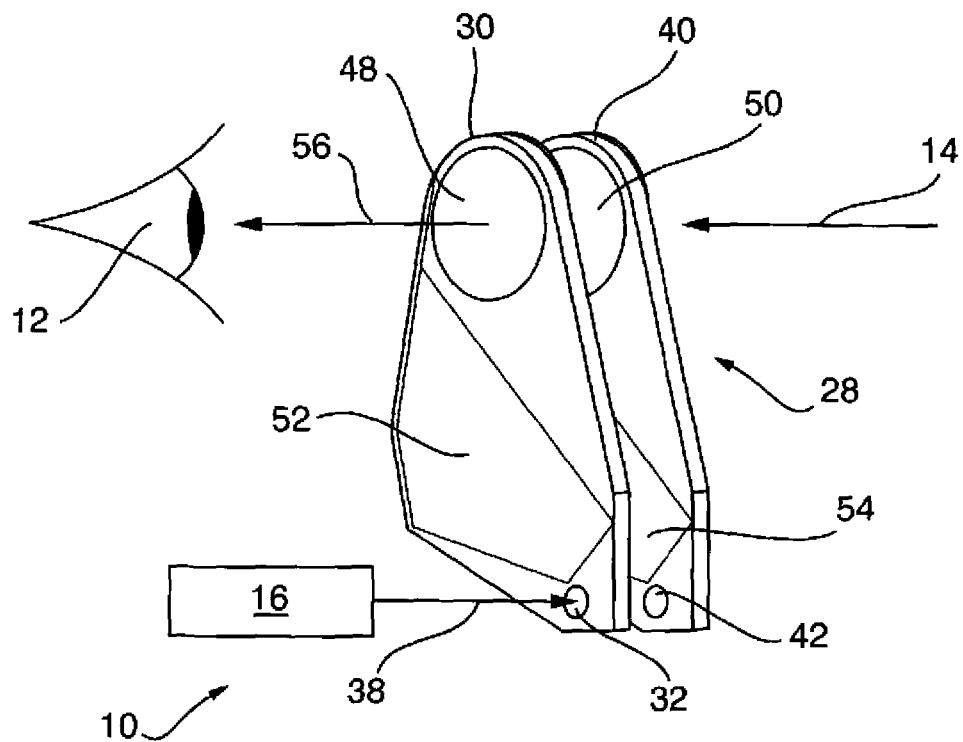
FIG. 1 shows a projection display according to preferred embodiments of the present invention.
Figure 2:
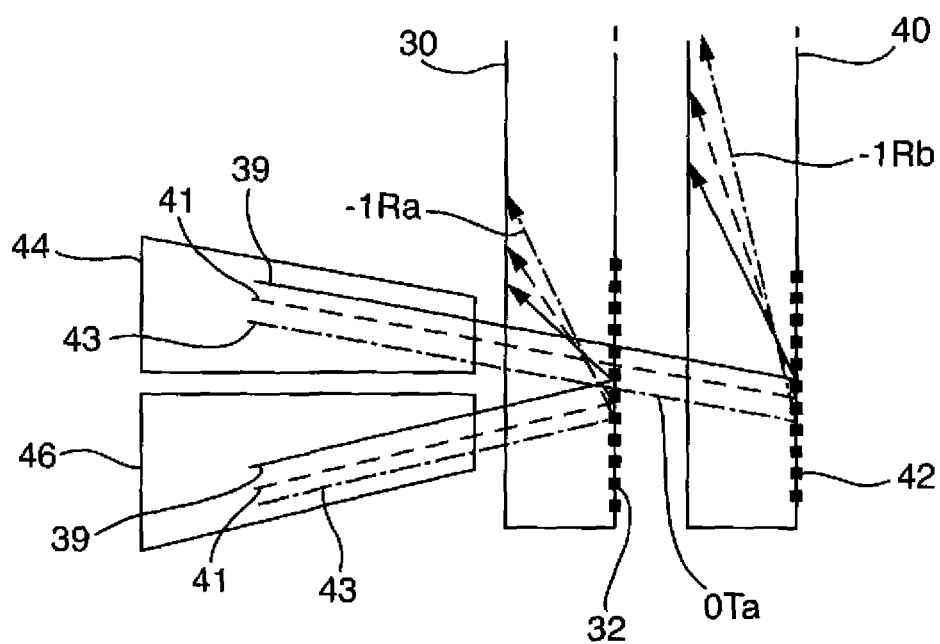
FIG. 2 shows schematically part of the projection display in use.

Referring firstly to FIG. 1 and to FIG. 2, a projection display 10 is shown for projecting a colour image to a viewer 12 such that the colour image may be seen overlain on a real world scene 14 being viewed through the display 10. The display 10 comprises an image generator 16 for generating image bearing chromatic light 38 for injection into a waveguide assembly 28 at a first range of field angles 44 and at a second range of field angles 46 (shown in FIG. 2). For simplicity, in FIG. 2, discrete rays of blue light 39, green light 41 and red light 43 are shown each representing single field angles within each of the ranges 44, 46, but it will be appreciated that light may be injected across the range of field angles within each range. As can been seen in FIG. 2, light of each colour is diffracted by a different amount for a given field angle.

Figure 13:
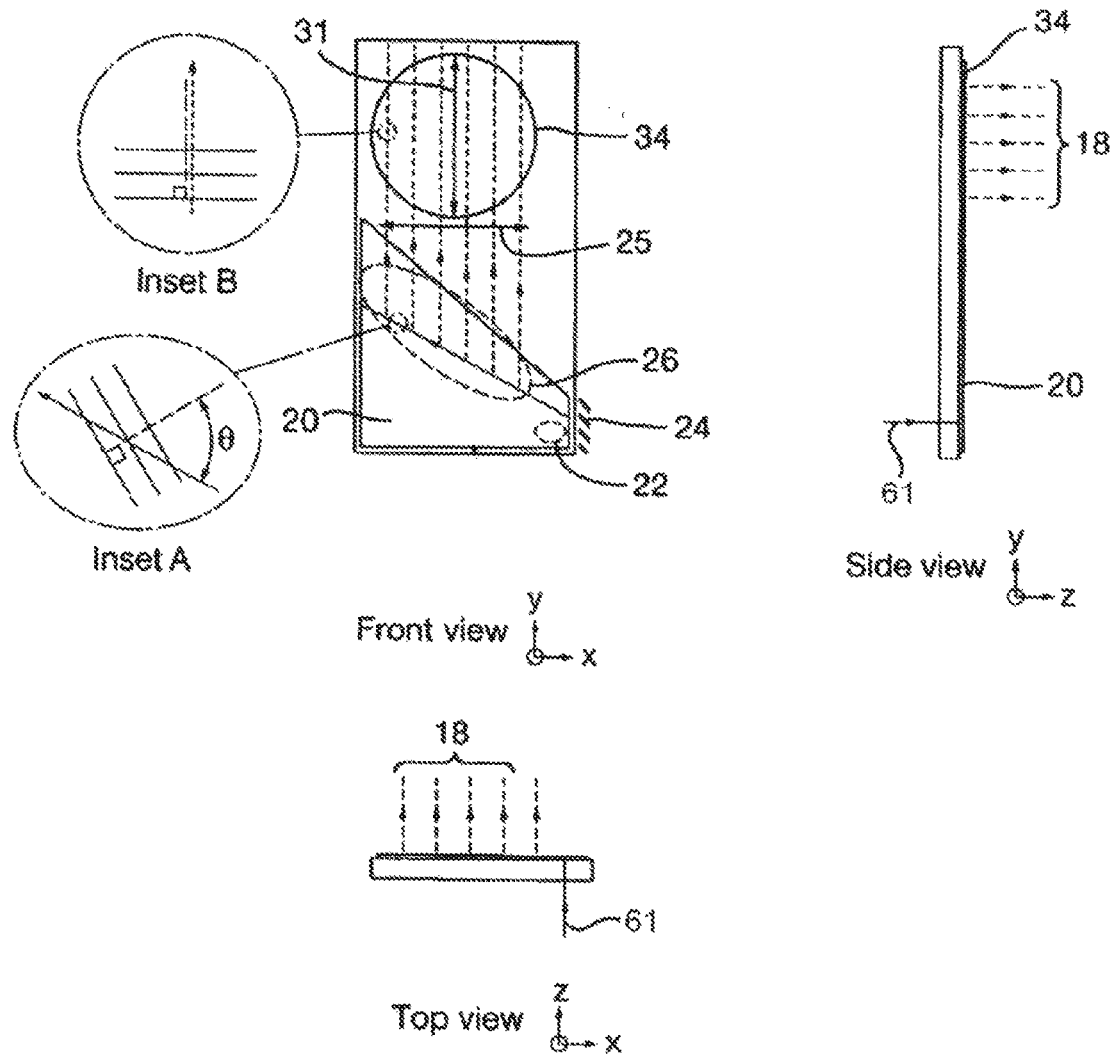
FIG. 13 shows a waveguide assembly of a known projection display.

The waveguide assembly 28 comprises two waveguides which are generally similar in construction to the waveguide 20 shown in the prior art device of FIG. 13, aside from the reflective portion 24 shown in FIG. 13 which may be optionally included in the present invention. A first waveguide 30 is provided with a first input diffraction grating 32 arranged to couple image bearing chromatic light 38 from the second range of field angles 46 into the first waveguide 30 to propagate by total internal reflection. A second waveguide 40 is provided with a second input diffraction grating 42 arranged to couple image bearing chromatic light 38 from the first range of field angles 44 into the second waveguide 40 to propagate by total internal reflection. FIG. 2 shows the propagation of light within a section of each of the waveguides 30, 40 in the vicinity of the first and second input gratings 32, 42.

The first and second waveguides 30, 40 have first and second output diffraction gratings 48, 50 arranged to couple the image bearing chromatic light out from the respective waveguides 30, 40, projecting a colour image from the first and second ranges of field angles 44, 46 towards a viewer so that it may be seen overlain on a real world scene 14 being viewed through the waveguide assembly 28.

In common with the device shown in FIG. 13, each waveguide 30, 40 is provided with a third diffraction grating 52, 54 respectively, arranged to expand the input pupil of the image-bearing light in a first dimension and to direct it towards the respective output diffraction grating 48, 50. The output gratings 48, 50 are arranged to expand the image-bearing light in a second generally orthogonal dimension and to output the image-bearing light from the waveguide assembly 28 with an expanded exit pupil.

As shown in FIG. 2, the first input diffraction grating 32 is arranged to be generally transmissive to image bearing chromatic light from the first range of field angles 44 allowing the light from the first range of field angles 44 to pass through the first waveguide 30 to the second waveguide 40, where it is coupled into the second waveguide 40 by the second input diffraction grating 42. Similarly, though not shown in FIG. 2, the first output grating 48 is configured to be generally transmissive to image-bearing light emerging from the second output grating 50 of the second waveguide 40, originally input to the second waveguide 40 from within the first range of field angles 44. More specifically, the first diffraction grating 32 is configured to diffract image bearing light from the second range of field angles 46 into the minus one reflected order (labelled "−1Ra" in FIG. 2) so as to begin propagating within the first waveguide. However, image-bearing light from the first range of field angles 44 is allowed to pass through the grating 32 undiffracted, as the zero transmission order (labelled "0Ta" in FIG. 2) and to enter the second waveguide 40. The second input diffraction grating 42 is configured to diffract that image bearing light from the first range of field angles 44 into the minus one reflected order (labelled "−1Rb" in FIG. 2) so as to begin propagating through the second waveguide 40. Each of the input diffraction gratings 32, 42 are configured by selection of one or more characteristics of the gratings: the pitches of the gratings determine how the light fields are shared between the two waveguides 30, 40; the grating profiles and the refractive indices of the substrate supporting or forming the gratings and the coatings applied to the gratings define the diffraction efficiency of the required orders for the gratings 32, 42.

Figure 3:
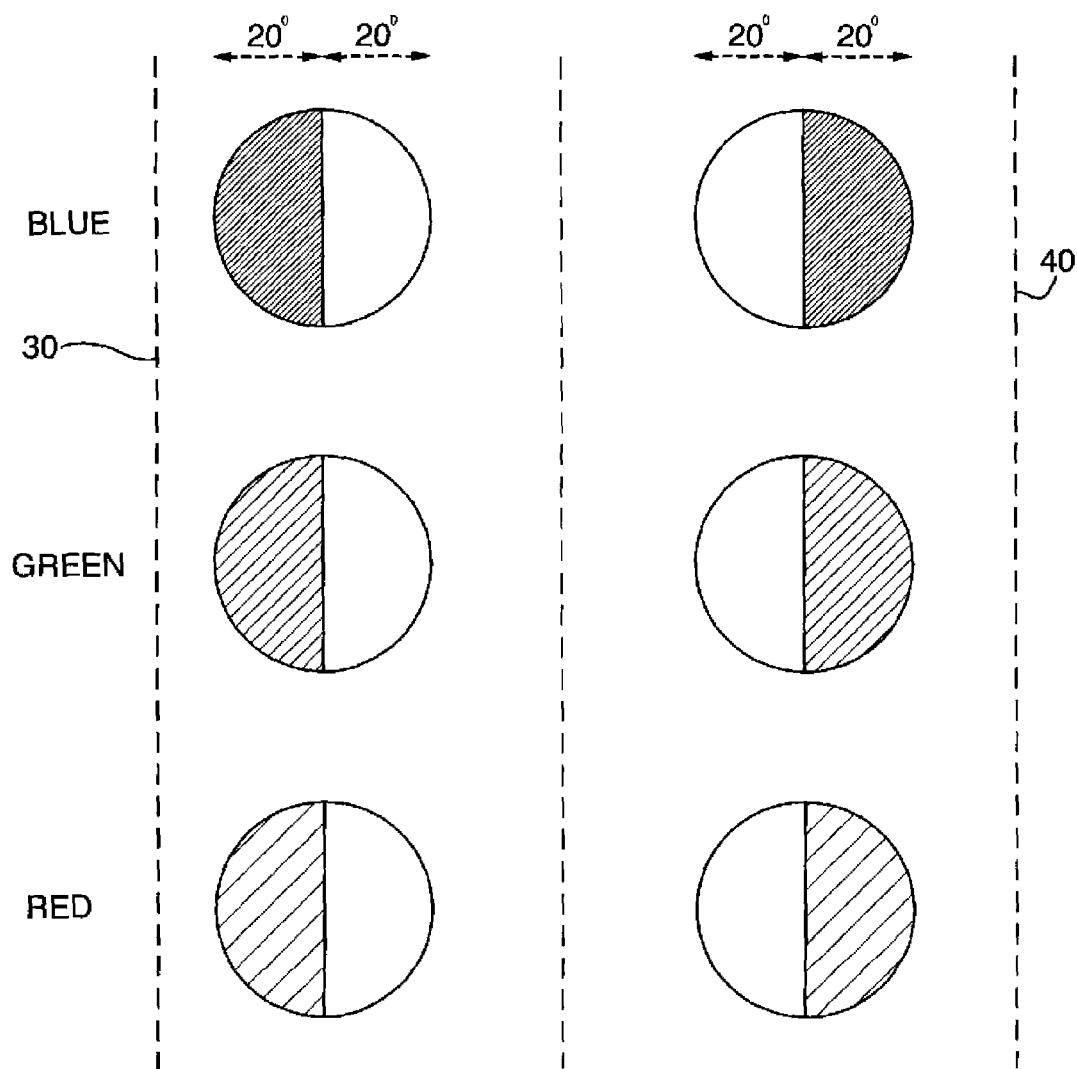
FIG. 3 shows in simplified form reproduction of colour and field of view in the projection display.

Referring to FIG. 3, an output from each of the first and second waveguides 30, 40 is shown by way of illustration of the principle of operation of the display device 10, showing each of the blue, green and red colours separately. In this example, that portion of a horizontal field of view of an image conveyed by each of the waveguides 30, 40 is shown for each of the colours blue, green and red. By way of example, that portion of a total field of view of an image being output from each waveguide 30, 40 is shown to be 20° in width, each waveguide providing a different 20° portion of the total field of view of the image-bearing light being input, the total field of view being defined by the first and second field angle ranges 44, 46 taken together. That portion generated by the first waveguide 30 as shown in the left hand images in FIG. 3 and that portion generated by the second waveguide 40 is shown in the right hand images in FIG. 3.

In practice, there may be an overlap between the first and second field of view ranges 44, 46 such that one waveguide may control a field of view from say −5° to 20° whilst the other waveguide controls a field of view of say −20° to 5°. Furthermore, the first and second waveguides 30, 40 need not necessarily control the same field of view extent. For example, one waveguide may control a 15° field of view from say 5° to 20° whilst the other waveguide may control a 25° field of view from say −20° to 5°. It will also be appreciated that the diffraction gratings of each waveguide 30, 40 are configured to control image bearing light in the full visible spectrum according to their respective fields of view. That is, the total field of view is split into two or more sub-fields containing full spectrum light and the sub-fields are conveyed through respective waveguides. However, one waveguide may control a greater field of view for light of one wavelength whilst the other waveguide may control a greater field of view for light of another wavelength. In this regard, one waveguide may control a field of view for red light from say 5° to 20° whilst the other waveguide may control a field of view for red light from say −20° to 5°. Conversely, one waveguide may control a field of view for the blue wavelength of light from say −20° to 5° whilst the other waveguide may control a field of view for the blue wavelength of light from say 5° to 20°. It should also be noted that whilst the images shown in FIG. 3 represent a display with a 40° total field of view it is possible to configure the display so that the overall field of view is more or less than 40°.

In other arrangements, more than two "stacked" waveguides may be provided for conveying respectively more than two sub-fields of view. For example, if the field of view is broken down into three sub-fields, three stacked waveguides, with associated diffraction gratings, would be required to convey each of the sub-fields through the display for reconstituting the final image across the total field of view.

In a preferred embodiment of the invention shown in FIG. 4, both the first and second waveguides may be arranged to display image-bearing light having a particular wavelength (e.g. green) across the a wider overall field of view than for other wavelengths, e.g. than for blue and red light. That is, the diffraction gratings of each of the first and second waveguides 30, 40 may be tuned to enable the display of respective portions of a wider input range of field angles for green light than for blue light or red light. A particular embodiment of the display device 10 configured for this mode of operation will now be described, initially with reference to FIG. 4.

Referring to FIG. 4, a similar portion of the display apparatus 10 is shown to that of FIG. 2 using the same numbering for features in common. However, in FIG. 4, first and second input diffraction gratings 58 and 60 are shown, numbered differently to the input gratings 32, 42 of FIG. 2 to emphasise a particularly preferred configuration of those gratings 58, 60 for use in an otherwise similar display device 10.

The first input grating 58 is configured to couple into the first waveguide 30 at least one selected wavelength of the image bearing chromatic light across the full extent of the second range of field angles 46 (say from 0° to +30°). Similarly, the second input grating 60 is configured to couple into the second waveguide 40 the same selected wavelength of the image bearing chromatic light across the full extent of the first range of field angles 44 (say from −30° to 0°) As for FIG. 2, light rays of three different wavelengths are shown in FIG. 4 being input from a single field angle within each range 44, 46. However, as indicated and shown in bold in FIG. 4, one selected wavelength, for example green light of between 600 nm and 500 nm, may be diffracted by the first and second input gratings 58, 60 respectively, in association with the further diffraction gratings 48, 50, 52, 54 in such a way that a viewer will see a full-field image in green light, preferably with each of the first and second waveguides contributing portions of the full 60° field of view of equal width. Therefore, the first and second output diffraction gratings 48, 50 and the third diffraction gratings 52, 54 are arranged to expand the exit pupil and output light of the at least one selected wavelength across the full extent of the first and second ranges 44, 46 of field angles.

In this embodiment, the diffraction gratings of both waveguides 30, 40 are tuned to provide the full field of view primarily for image bearing light of one selected wavelength (green in this example). Image bearing chromatic light of a wavelength different from that wavelength (blue and red) is coupled into and output from the first and the second waveguides 30, 40 across less than the full extent of the first range of field angles 44 (say from −15° to 0°) and of the second range of field angles (say from 0° to +15° ) such that the image output from the waveguide assembly 10 can be viewed over a larger range of field angles (say −30° to +30°) in green light but over a smaller range of field angles (say −15° to +15°) in light of red and blue wavelengths. This preferred wavelength-dependent variation in displayed field of view will now be described further with reference to FIG. 5.

Referring to FIG. 5, in this embodiment the device 10 displays a colour image (red, green, blue) which can be viewed from a smaller range of field angles, close to the 0° angle perpendicular to the plane of the display 10, than from the range of field angles available for monochrome light of the selected wavelength (green). The difference between the larger range of field angles and the smaller range of field angles (the difference in the above example being −15° to −30° and +15° to +30°) may be arranged to correspond generally to the range of peripheral vision of a human viewer, while the smaller range of field angles corresponds generally to the angular range of full colour perception of a human viewer. The cones of a human retina which perceive colour images have a higher concentration around a central, foveal, field of view corresponding generally to the field of view that the display device 10 provides for colour images. The rods of the retina in a human are primarily responsible for peripheral (and night) vision and perceive images in monochrome over a field of view corresponding substantially to the field of view of the display device 10 for monochrome images. Since there is a reduced concentration of cones on the retina responsible for peripheral vision, the display is not arranged to display full colour in those regions.

The display of this embodiment finds particular utility in a head mounted display which may for example be used by an aircraft pilot. The pilot may be alerted to an object by providing monochrome images at a wide field of view corresponding to his peripheral vision. Once alerted to the object, the pilot can turn his head towards the object so that the object is located within the central field of view of the display. The displayed image would then be displayed in colour providing additional information about the object.

As described above, the first and second waveguides 30, 40 comprise respectively first expansion diffraction regions 52, 54 for expanding the input pupil in the first dimension and second expansion diffraction regions 48, 50 for expanding the input pupil in the second dimension. The first and second output diffraction regions which serve to output the exit pupil may form one of the first expansion diffraction regions or the second expansion diffraction regions. In the drawings, and as described, the output diffraction regions form the second expansion diffraction regions. The described embodiments are arranged to increase the total field of view compared to the discussed prior art in one of the first dimension or the second dimension. As shown particularly in FIGS. 3 and 5, the total field of view is expanded in the horizontal dimension with respect to a viewer. That is, if the viewer is an upright orientation, the field of view is expanded to a greater extent in the horizontal dimension than in the vertical dimension. In FIG. 3, the horizontal field of view in full spectrum is increased to 40° whereas the vertical field of view is 20°. In FIG. 5, the horizontal field of view for at least one wavelength (e.g. green) is increased to 60° whereas the vertical field of view is 30°. Generally an increased horizontal field of view is more useful than an increased vertical field of view.

The diffraction regions 52, 54 in the embodiments are arranged to expand the input pupil in a generally horizontal dimension and therefore are configured for diffracting respectively a first range of field angles propagating through the first waveguide and a second range of field angles propagating through the second waveguide. The correct configuration of the gratings is achieved by the proper choice of grating pitch, grating form and grating coatings for each waveguide.

Whilst the present embodiments are directed to increasing the horizontal field of view, the invention equally covers arrangements in which the vertical field of view is increased or in which both the horizontal and vertical fields of view are increased. Of course, it will also be appreciated that the expansion diffraction regions of the waveguides assembly need not be arranged to expand the input pupil in vertical and horizontal dimensions but instead at angles to the horizontal and vertical dimensions e.g. at 90° and 270°.

The input diffraction regions 58, 60 of the FIG. 4 embodiment will now be described in more detail with reference to FIGS. 6 to 9.

The field separation into first and second sub-fields is performed by the first input diffraction region of the first waveguide. The first and second input diffraction regions must also be configured to diffract the input pupil for each sub-field efficiently in the correct order. The configuration of the region includes the correct choice of pitches for grating 58 and grating 60 (one pitch being dissimilar to the other pitch, for determining the division of the sub-fields between waveguides); the optimum grating profiles; and by the application of suitable coating layers on the surfaces of gratings. The selected pitches and profiles determine the diffraction efficiency of the required orders.

Figure 6:
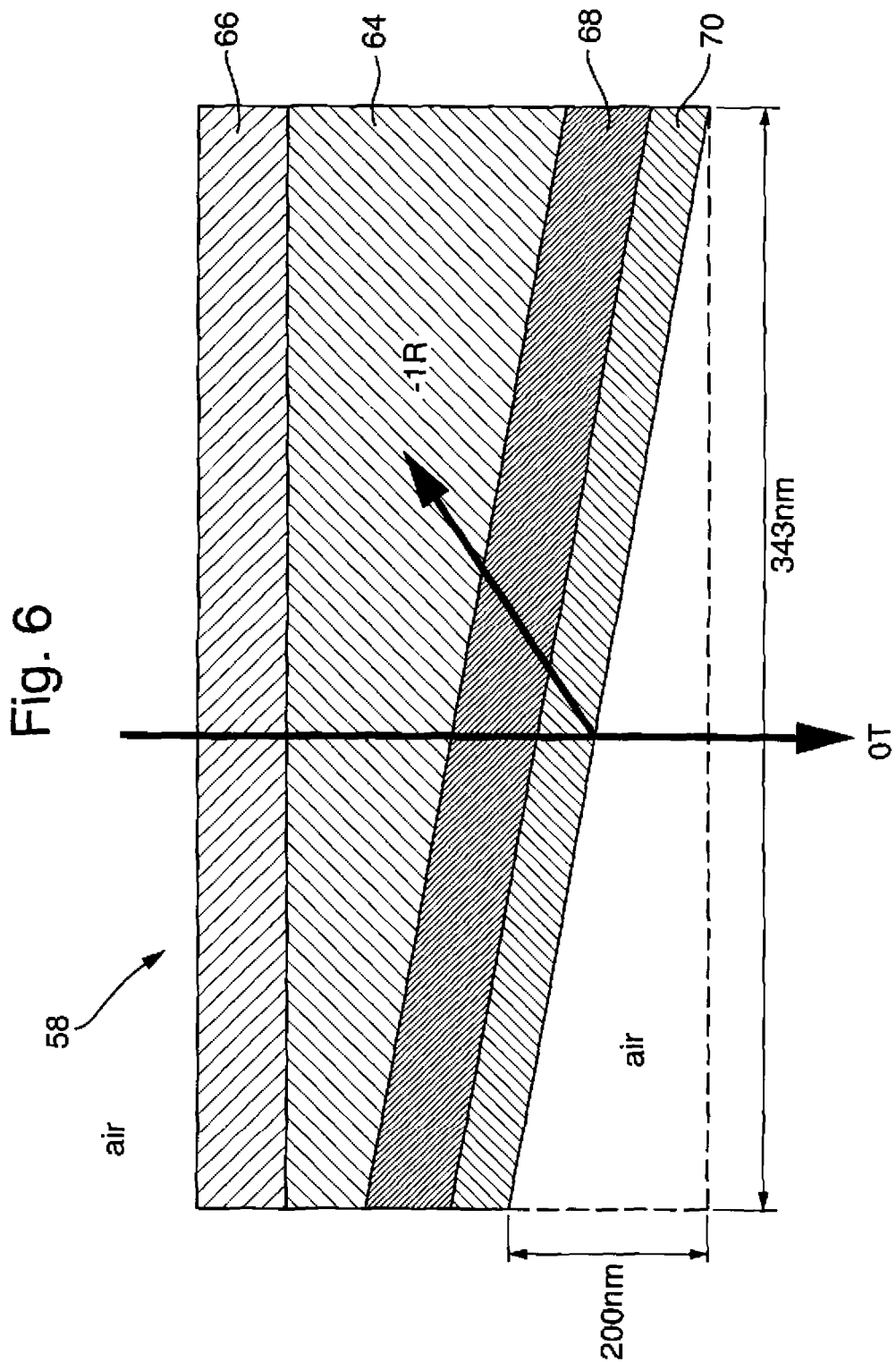
FIG. 6 shows in more detail a grating structure of a first input diffraction region of the projection display of FIG. 3.

A preferred implementation of the waveguides 30, 40 and their respective diffraction gratings will now be described in more detail. A grating structure of diffraction region 58 is shown in FIG. 6. The grating has a saw tooth profile with a pitch 'd' of 343 nm and a height 'h' of 200 nm. The refractive index 'n' of the optically transparent polymer 64 onto which the gratings are replicated is 1.68 whilst the refractive index of the substrate 66 is 1.81. A coating 68 made of TiO2 and of 40 nm thickness is formed on the surface of the grating. A second coating 70 made of SiO2 and of 100 nm thickness is formed on the surface of the first coating 68.

Figure 7:
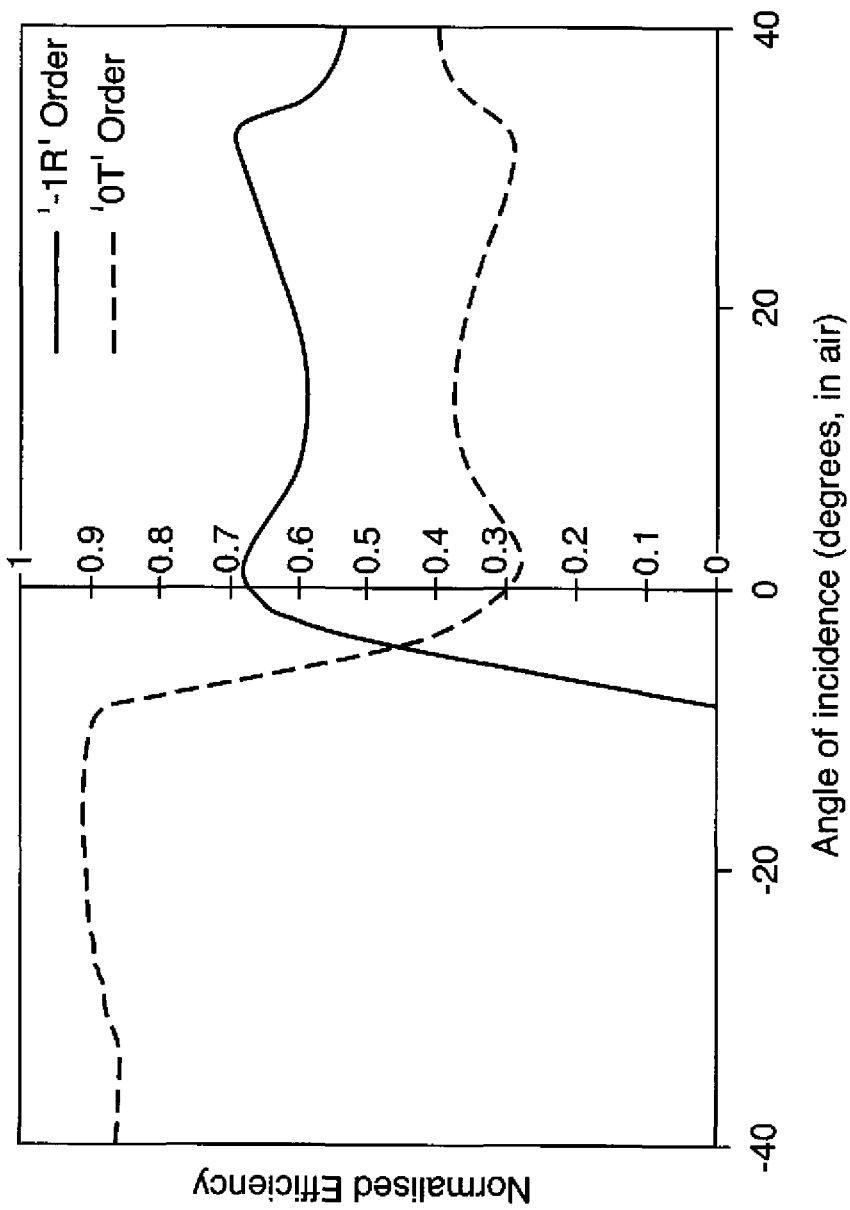
FIG. 7 shows the response of the first input diffraction region on injection of light.

FIG. 7 shows the response of the grating in FIG. 6 at 532 nm (light in the green waveband). Normalised efficiency is plotted against angle of incidence (degrees, in air). The graph shows the minus one reflected order in solid lines and the zero transmission order in broken lines. It will be seen that at angles of incidence less than approximately −8°, the grating does not diffract the rays into the '−1R' order. The zero order transmission in this region is approximately 90%. At angles between −5° degrees and +33° degrees, the efficiency of the '−1R' order is generally over 60%. In this example therefore the first input diffraction region 58 diffracts image bearing light in the green waveband to propagate by total internal reflection in the first waveguide when injected at angles of incidence in a first range of field angles above about −5° and up to about 40°. The first input diffraction region 58 allows image bearing light in the green waveband to pass therethrough when injected at angles of incidence in a second range of field angles below about −8°.

Figure 8:
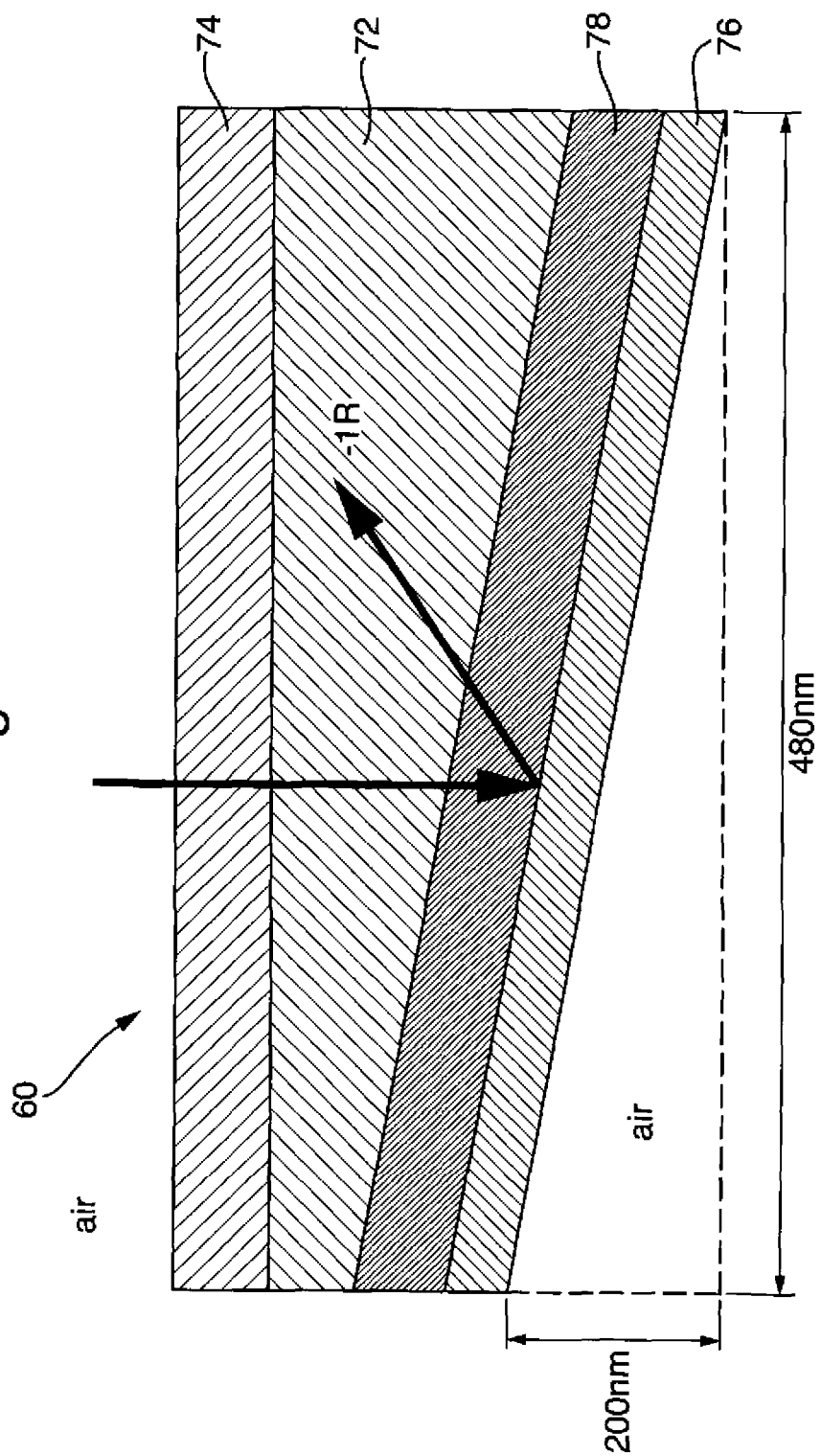
FIG. 8 shows in more detail a grating structure of a second input diffraction region of the projection display of FIG. 3.

A grating structure of diffraction region 60 is shown in FIG. 8. The grating has a saw tooth profile with a pitch 'd' of 480 nm and a height 'h' of 200 nm. The refractive index 'n' of the optically transparent polymer 72 onto which the gratings are replicated is 1.68 whilst the refractive index of the substrate 74 is 1.81. A coating 76 made of Ag and of 150 nm thickness is formed on the surface of the grating. A second coating 78 made of TiO2 and of 70 nm thickness is formed on the surface of the first coating 76.

Figure 9:
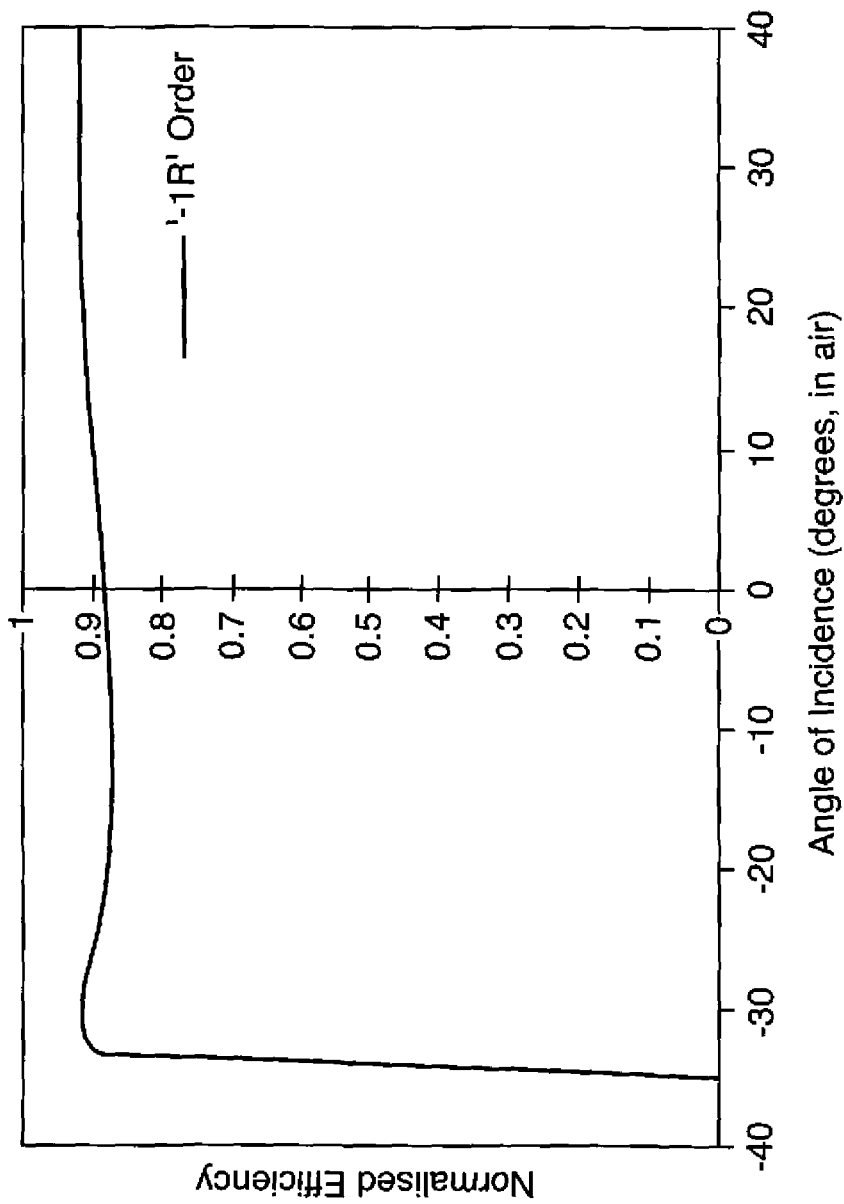
FIG. 9 shows the response of the second input diffraction region on injection of light.

FIG. 9 shows the response of the grating in FIG. 8 at 532 nm (light in the green waveband). Normalised efficiency is plotted against angle of incidence (degrees, in air). The graph shows the −1 reflected order in solid lines. At angles of incidence greater than −33 degrees, the diffraction efficiency of the grating is greater than 85% for light of 532 nm wavelength in the green waveband.

For any incident ray (at a given angle and wavelength), the input efficiency of the display is given by:

Efficiency of grating 58 plus the product of the zero order transmission of grating 58 and the '−1R' efficiency of grating 60 i.e. System input efficiency='−1Ra'+('0Ta'*'−1Rb').

Figure 10:
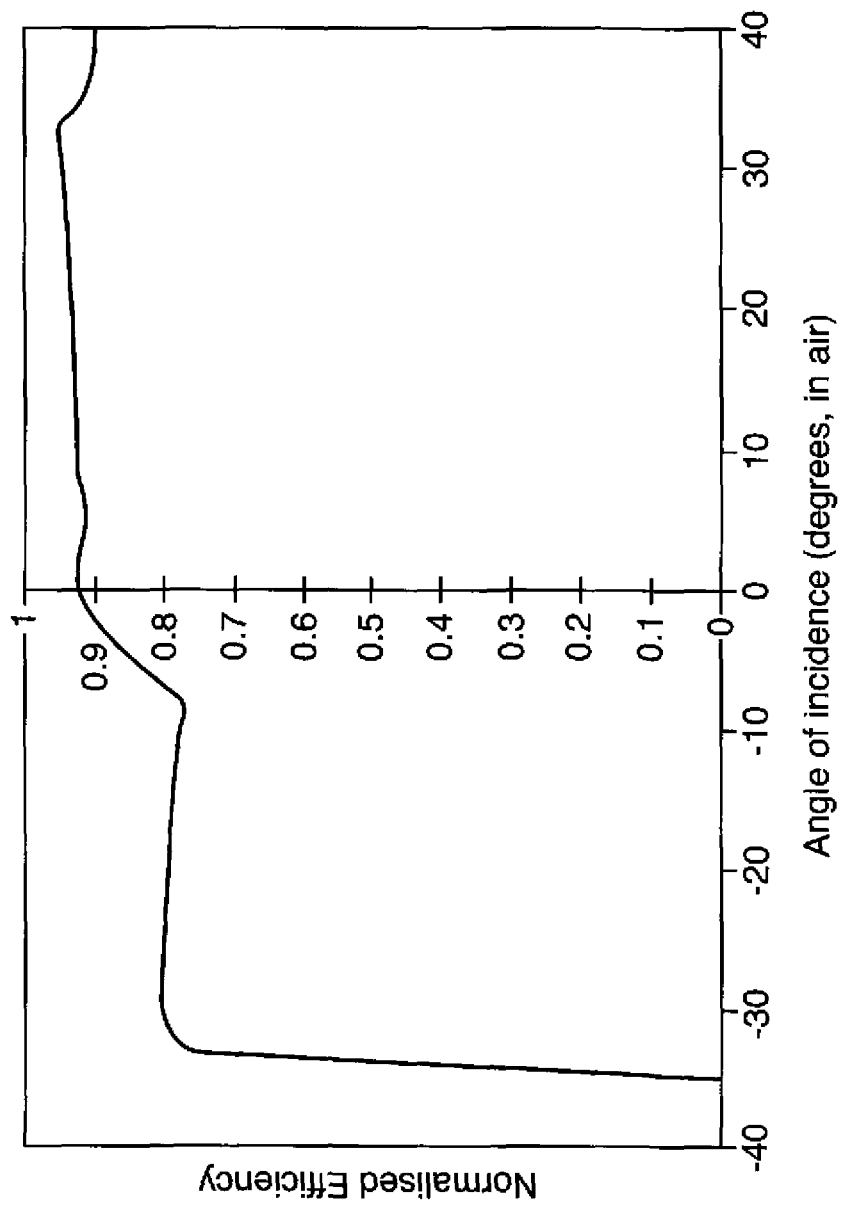
FIG. 10 shows the efficiency of the projection display of FIG. 3.

The efficiency of the display is shown in FIG. 10 for three wavelengths i.e. in the red, green and blue wavebands. The system input efficiency spans over total field of view combining both the first and second range of field angles from −33° to +33° degrees and has high efficiency of around 75% or more.

Figure 11:
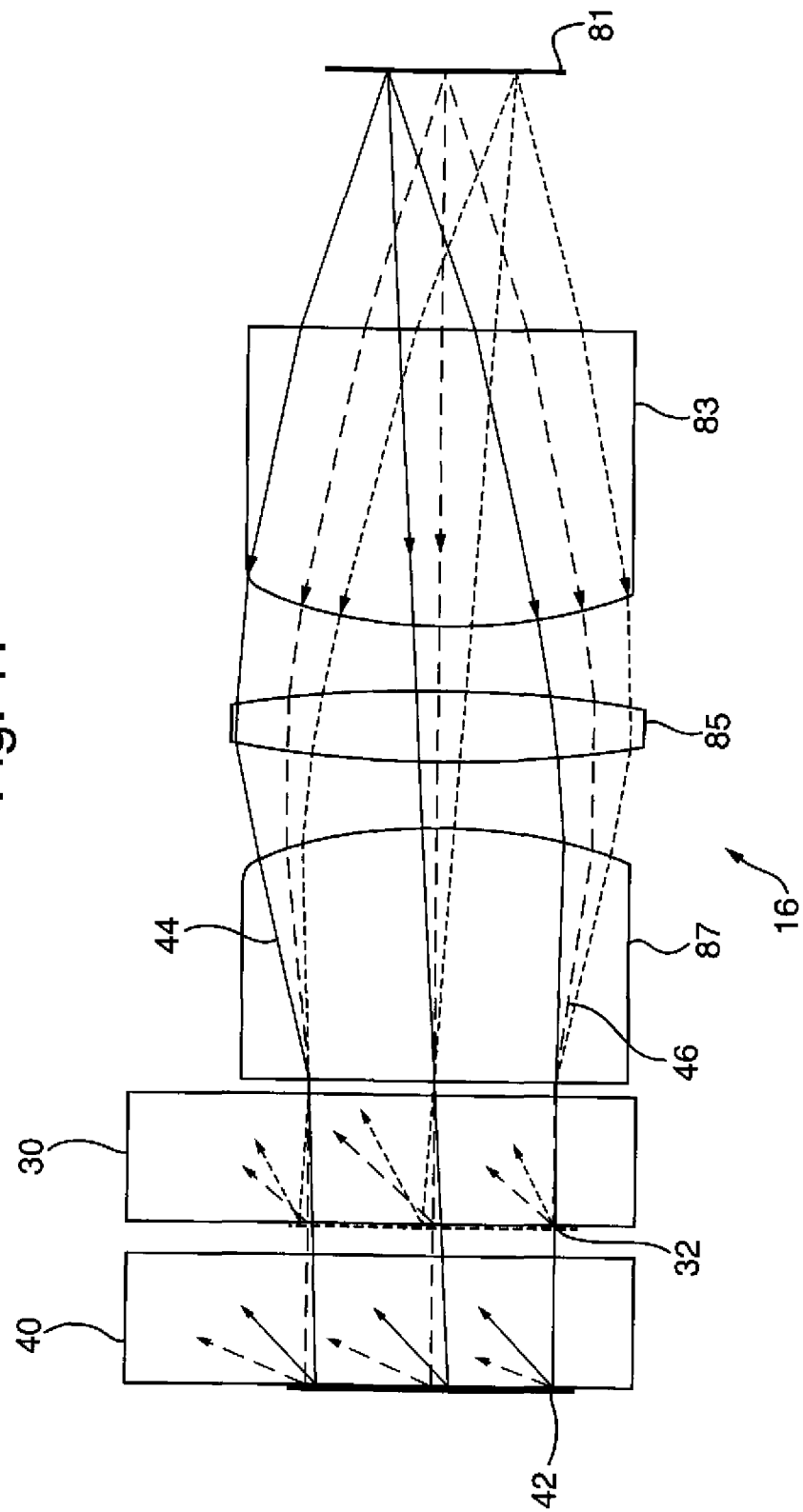
FIG. 11 shows schematically an image generator of either of the projection displays.

As shown in FIG. 11, the image generator 16 comprises a light processor, such as a transmissive liquid crystal display 81, for modulating light received from a source of chromatic light (not shown) for generating image bearing light. The image bearing light passes through a series of lenses 83, 85, 87 which cause the light to be injected into the waveguide assembly over first and second field of view ranges 44, 46.

Figure 12A:
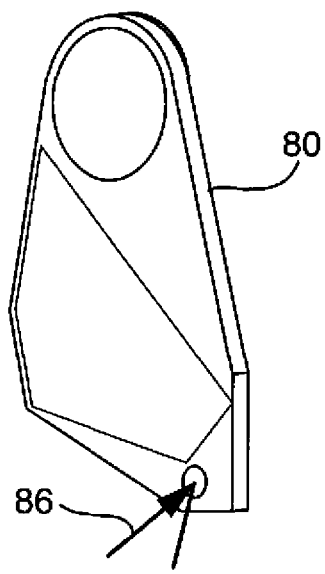
FIG. 12 shows a waveguide assembly of another projection display.
Figure 12B:
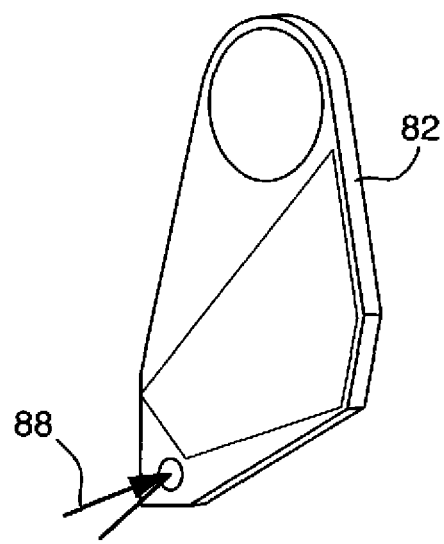
Figure 12C:
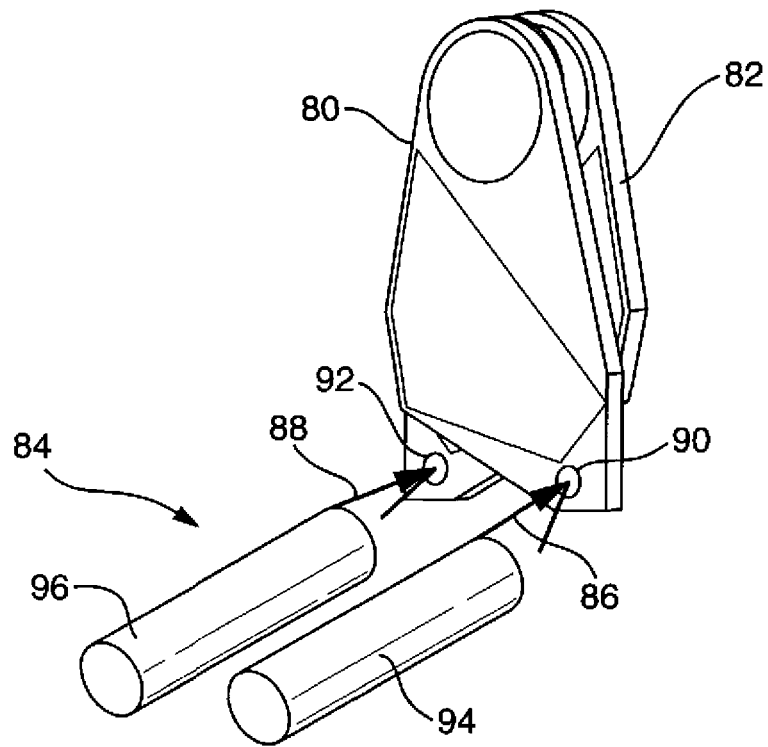

A further embodiment of the present invention is shown in FIG. 12. The waveguide assembly of this projection display comprises two waveguides 80, 82. The first waveguide 82 is shown in FIG. 12(a), the second waveguide 82 is shown in FIG. 12(b) and both waveguides are shown in FIG. 12(c) together with an image generator 84. For the sake of brevity, only those differences from the previously described embodiments will be described in detail with reference to FIG. 12.

The image generator 84 is arranged to split an input pupil of image bearing chromatic light into the first range of field angles 86 for injection into the first waveguide 80 and the second range of field angles 88 for injection into the second waveguide 82. As shown in FIG. 12, the image generator comprises a first image generator element 94 for generating the first range of field angles and a second image generator element 96 for generating the second range of field angles. The first input diffraction region 90 is located to receive image bearing chromatic light in the first range of field angles from the image generator and the second input diffraction region 92 is located to receive image bearing chromatic light in the second range of field angles from the image generator. The first and second input diffraction regions are located to allow light in the second range of field angles 88 to be received by the second input diffraction region 92 without passing through the first input diffraction region 90. Therefore, this embodiment is unlike the previously described embodiments in which one or more of the input diffraction regions serves to split the field of view by allowing light at certain angles of incidence to pass through the input diffraction region (in the 0T order) and other angles of incidence to be diffracted (in the −1R order). In the present embodiment the field of view is split into sub-fields prior to injection into the waveguide assembly, by suitable configuration of the image generator.

As will be seen from FIG. 1, the first waveguide 80 is symmetrically opposite in configuration to the second waveguide 82. The first waveguide may be considered right-handed and the second waveguide may be considered left handed. In this way, the first waveguide does not obstruct rays of light emitted by the second waveguide element from being received by the second input diffraction region 92. It will be appreciated that other waveguide configurations may be adopted whilst still allowing light in the second range of field angles to travel directly from the image generator to the second input diffraction region.

The embodiment shown in FIG. 12 may be arranged similarly to the embodiment described with reference to FIGS. 1 to 3 in that the first waveguide 80 conveys the full spectrum of visible of light in the first range of field angles 86 and the second waveguide 82 conveys the full spectrum of visible of light in the second range of field angles 86. Alternatively, the FIG. 12 embodiment can be arranged to produce a larger total field of view for a selected wavelength such as in the green waveband as described in relation to FIGS. 4 to 11.

As described in relation to FIGS. 1 to 12, the embodiments comprise waveguides each having three diffraction regions. As shown particularly in FIG. 1, the diffraction regions may be formed by three discrete diffraction gratings. Alternatively, as shown in relation to the prior art in FIG. 12, the input diffraction region and first expansion region may be formed by a single grating. In this latter regard, the input diffraction region diffracts the input pupil in the −1 reflective order towards a reflective surface which in turn reflects it towards the first expansion region for further diffraction. Alternatively, the first expansion region and the second expansion region (output diffractive region) may be formed by a single grating with a reflective located to receive diffracted light from the first expansion region for reflecting it towards the second expansion region for further refraction.

The embodiments disclosed herein relate to a waveguide assembly in which the waveguides expand the input pupil in first and second orthogonal dimensions. The invention is equally applicable to a waveguide assembly in which each waveguide comprises a first waveguide element for expanding the input pupil in a first dimension and second waveguide element for expanding the input in a second generally orthogonal dimension and outputting it from the waveguide. Where there are a plurality of waveguide elements they may be arranged in a plate-plate configuration in which image bearing light propagates by total internal reflection between opposed and parallel sides of each waveguide element. Alternatively, one of the elements may have a rod configuration in which image bearing light propagates by total internal reflection reflecting from each of the four sides of the waveguide element in turn.

The invention claimed is:

1. A projection display for projecting a colour image to a viewer overlaid on a real world scene viewed through the display, the display comprising:
an image generator for generating image bearing chromatic light for injection into a waveguide assembly at a first range of field angles with respect to the waveguide assembly and a second range of field angles with respect to the waveguide assembly;
the waveguide assembly comprising:
a first waveguide having a first input diffraction region arranged to couple the image bearing chromatic light in the first range of field angles into the first waveguide to propagate by total internal reflection; and
a second waveguide having a second input diffraction region arranged to couple the image bearing chromatic light in the second range of field angles into the second waveguide to propagate by total internal reflection;
wherein the first and second waveguides have first and second output diffraction regions arranged to output the propagated image bearing chromatic light from the respective waveguides for projection from the waveguide assembly as a colour image in the first and second ranges of field angles, the projected colour image being overlaid on a real world scene viewed through the waveguide assembly; and
wherein the image bearing chromatic light has at least one first wavelength and at least one second wavelength different than the at least one first wavelength, the at least one first wavelength being coupled into and projected from the waveguide assembly across at least a portion of the first and second ranges of field angles, the at least one second wavelength of the light being coupled into and projected from the waveguide assembly across a range of field angles smaller than the projected range of field angles of the at least one first wavelength of the light, wherein a difference between the projected range of field angles of the at least one first wavelength of light and the projected range of field angles of the at least one second wavelength of light corresponds to a range of peripheral vision of a human viewer, and wherein the projected range of field angles of the at least one second wavelength of light corresponds to an annular range of full colour perception of the human viewer.

2. A projection display as claimed in claim 1, wherein the first input diffraction region is arranged to be generally transmissive to image bearing chromatic light in the second range of field angles allowing the light in the second range of field angles to pass through the first waveguide to the second waveguide.

3. A projection display as claimed in claim 1, wherein the first input diffraction region is arranged to couple into the first waveguide the at least one first wavelength of the image bearing chromatic light across a full extent of the first range of field angles and the first output diffraction region is arranged to output light of said at least one first wavelength from the first waveguide across the full extent of the first range of field angles.

4. A projection display as claimed in claim 1, wherein the second input diffraction region is arranged to couple into the second waveguide the at least one first wavelength of the image bearing chromatic light across a full extent of the second range of field angles and the second output diffraction region is arranged to output light of said at least one first wavelength from the second waveguide across the full extent of the second range of field angles.

5. A projection display as claimed in claim 1:
wherein the first input diffraction region is arranged to couple into the first waveguide the image bearing chromatic light having the at least one first wavelength across a full extent of the first range of field angles,
wherein the first output diffraction region is arranged to output the light of said at least one first wavelength from the first waveguide across the full extent of the first range of field angles,
wherein the second input diffraction region is arranged to couple into the second waveguide the image bearing chromatic light having the at least one first wavelength across a full extent of the second range of field angles,
wherein the second output diffraction region is arranged to output the light of said at least one first wavelength from the second waveguide across the full extent of the second range of field angles, and
wherein the image bearing chromatic light of the at least one second wavelength is coupled into and output from the first and the second waveguides across less than the full extent of at least one of the first range of field angles and the second range of field angles.

6. A projection display as claimed in claim 1, wherein said at least one first wavelength of light corresponds to green light and the at least one second wavelength of light corresponds to at least one of red light and blue light.

7. A projection display as claimed in claim 1, wherein a full extent of the first and second ranges of field angles is between 20° and 60°, wherein the first range of field angles is from 0° perpendicular to a plane of the waveguide assembly up to between +10° and +30° to the perpendicular, and wherein the second range of field angles is from 0° perpendicular to the plane of the waveguide assembly down to between −10° and −30° to the perpendicular.

8. A projection display as claimed in claim 1, wherein the image generator is arranged to generate an input pupil of image bearing chromatic light for expansion in first and second generally orthogonal dimensions by the waveguide assembly and for outputting an expanded exit pupil from the assembly, and wherein the first and second waveguides comprise respectively first expansion diffraction regions for expanding the input pupil in the first dimension and second expansion diffraction regions for expanding the input pupil in the second dimension, said first and second output diffraction regions forming one of said first expansion diffraction regions or said second expansion diffraction regions.

9. A projection display as claimed in claim 8, wherein the first range of field angles and the second range of field angles are ranges in at least one of the first dimension or the second dimension.

10. A projection display as claimed in claim 9, wherein the first dimension corresponds generally with a horizontal dimension with respect to the viewer and the second dimension corresponds generally with a vertical dimension with respect to the viewer, and the first and the second range of field angles are angles in the horizontal dimension such that the total range of field angles output from the waveguide assembly is larger in the horizontal dimension than in the vertical dimension.

11. A projection display as claimed in claim 1, wherein the image generator comprises a light processor for generating image bearing light and a lens for directing said image bearing light towards the waveguide assembly over the first and the second range of field angles.

12. A projection display as claimed in claim 1, wherein the image generator is arranged to split an input pupil of image bearing chromatic light into the first range of field angles for injection into the first waveguide and the second range of field angles for injection into the second waveguide, the first input diffraction region is located to receive image bearing chromatic light in the first range of field angles from the image generator and the second input diffraction region is located to receive image bearing chromatic light in the second range of field angles from the image generator.

13. A projection display as claimed in claim 12, wherein the first and second input diffraction regions are located to allow light in the second range of field angles to be received by the second input diffraction region without passing through the first input diffraction region.

* * * * *